United States Patent
Ema et al.

(10) Patent No.: US 12,190,208 B2
(45) Date of Patent: Jan. 7, 2025

(54) DATA MANAGEMENT SYSTEM, DATA MANAGEMENT METHOD, AND RECORDING MEDIUM HAVING RECORDED THEREON A DATA MANAGEMENT PROGRAM

(71) Applicant: YOKOGAWA ELECTRIC CORPORATION, Tokyo (JP)

(72) Inventors: Nobuaki Ema, Tokyo (JP); Yoshitaka Yoshida, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 1038 days.

(21) Appl. No.: 17/144,058

(22) Filed: Jan. 7, 2021

(65) Prior Publication Data

US 2021/0295212 A1    Sep. 23, 2021

(30) Foreign Application Priority Data

Mar. 23, 2020   (JP) .................. 2020-051054

(51) Int. Cl.
  *G06N 20/00*   (2019.01)
  *G05B 13/02*   (2006.01)
  *G06F 3/06*    (2006.01)

(52) U.S. Cl.
  CPC ......... *G06N 20/00* (2019.01); *G05B 13/0265* (2013.01); *G06F 3/0608* (2013.01); *G06F 3/0652* (2013.01); *G06F 3/0673* (2013.01)

(58) Field of Classification Search
  CPC .. G06N 20/00; G05B 13/0265; G06F 3/0608; G06F 3/0652; G06F 3/0673
  See application file for complete search history.

(56) References Cited

U.S. PATENT DOCUMENTS

| | | |
|---|---|---|
| 2016/0239753 A1 | 8/2016 | Loehlein |
| 2016/0337495 A1* | 11/2016 | Akita .................... H04M 1/663 |
| 2017/0364528 A1* | 12/2017 | Hwang .................. G06N 20/00 |
| 2018/0108355 A1* | 4/2018 | Weinstein ........... G06F 21/6254 |
| 2021/0264108 A1* | 8/2021 | Yamada ................. G06N 20/00 |

FOREIGN PATENT DOCUMENTS

| | | |
|---|---|---|
| EP | 2668545 A1 | 12/2013 |
| JP | H11259444 A | 9/1999 |
| JP | 2004287947 A * | 10/2004 |
| JP | 2011175540 A | 9/2011 |

(Continued)

OTHER PUBLICATIONS

Office Action issued for counterpart Japanese Application No. 2020-051054, issued by the Japanese Patent Office on Dec. 20, 2022 (drafted on Dec. 9, 2022).

(Continued)

*Primary Examiner* — Benjamin P Geib (57) ABSTRACT

A data management system is provided. The data management system includes: a data acquisition unit for acquiring measurement data on a measurement target; a data storage unit for storing the measurement data; a data transmission unit for transmitting training data in the measurement data, used for training a model, to a learning unit for training the model; and a data deletion unit for deleting the training data from the stored measurement data.

8 Claims, 7 Drawing Sheets

(56) References Cited

FOREIGN PATENT DOCUMENTS

| JP | 2016537702 A | 12/2016 | | |
|----|--------------|---------|---|---|
| JP | 2018033050 A | 3/2018 | | |
| JP | 2019121088 A | 7/2019 | | |
| WO | WO-2012103290 A1 * | 8/2012 | ............. | G06N 20/00 |
| WO | WO-2015190203 A1 * | 12/2015 | ............. | G06N 99/00 |

OTHER PUBLICATIONS

Extended European Search Report for counterpart European Application No. 21152691.8, issued by the European Patent Office on Jun. 30, 2021.

* cited by examiner

FIG. 1

| TIME T | SENSOR A | SENSOR B | SENSOR C | SENSOR D |
|---|---|---|---|---|
| 1 | a1 | b1 | c1 | d1 |
| 2 | a2 | b2 | c2 | d2 |
| 3 | a3 | b3 | c3 | d3 |
| 4 | a4 | b4 | c4 | d4 |
| 5 | a5 | b5 | c5 | d5 |
| 6 | a6 | b6 | c6 | d6 |
| 7 | a7 | b7 | c7 | d7 |
| 8 | a8 | b8 | c8 | d8 |
| 9 | a9 | b9 | c9 | d9 |
| 10 | a10 | b10 | c10 | d10 |
| 11 | a11 | b11 | c11 | d11 |
| 12 | a12 | b12 | c12 | d12 |
| 13 | a13 | b13 | c13 | d13 |
| 14 | a14 | b14 | c14 | d14 |
| 15 | a15 | b15 | c15 | d15 |
| 16 | a16 | b16 | c16 | d16 |
| 17 | a17 | b17 | c17 | d17 |
| 18 | a18 | b18 | c18 | d18 |
| 19 | a19 | b19 | c19 | d19 |
| 20 | a20 | b20 | c20 | d20 |
| . | . | . | . | . |
| . | . | . | . | . |
| . | . | . | . | . |

MEASUREMENT DATA BEFORE DELETION

MEASUREMENT DATA AFTER DELETION

FIG. 4

| TIME T | SENSOR A | SENSOR B | SENSOR C | SENSOR D |
|---|---|---|---|---|
| 1 | a1 | b1 | c1 | d1 |
| 2 | a2 | b2 | c2 | d2 |
| 3 | a3 | b3 | c3 | d3 |
| 4 | a4 | b4 | c4 | d4 |
| 5 | a5 | b5 | c5 | d5 |
| 6 | | b6 | | |
| 7 | | b7 | | |
| 8 | | b8 | | |
| 9 | | b9 | | |
| 10 | | b10 | | |
| 11 | | b11 | | |
| 12 | | b12 | | |
| 13 | | b13 | | |
| 14 | | b14 | | |
| 15 | | b15 | | d15 |
| 16 | | b16 | | d16 |
| 17 | | b17 | | d17 |
| 18 | | b18 | | d18 |
| 19 | | b19 | | d19 |
| 20 | | b20 | | d20 |
| . | . | . | . | . |

500 PROHIBITION LIST

| TIME T | SENSOR A | SENSOR B | SENSOR C | SENSOR D |
|---|---|---|---|---|
| 1 | a1 | b1 | c1 | d1 |
| 2 | a2 | b2 | c2 | d2 |
| 3 | a3 | b3 | c3 | d3 |
| 4 | a4 | b4 | c4 | d4 |
| 5 | a5 | b5 | c5 | d5 |
| 6 | N/A | b6 | N/A | N/A |
| 7 | N/A | b7 | N/A | N/A |
| 8 | N/A | b8 | N/A | N/A |
| 9 | N/A | b9 | N/A | N/A |
| 10 | N/A | b10 | N/A | N/A |
| 11 | a11 | b11 | c11 | N/A |
| 12 | a12 | b12 | c12 | N/A |
| 13 | a13 | b13 | N/A | N/A |
| 14 | a14 | b14 | N/A | N/A |
| 15 | a15 | b15 | N/A | d15 |
| 16 | N/A | b16 | c16 | d16 |
| 17 | N/A | b17 | c17 | d17 |
| 18 | N/A | b18 | c18 | d18 |
| 19 | a19 | b19 | c19 | d19 |
| 20 | a20 | b20 | c20 | d20 |
| . | . | . | . | . |

MEASUREMENT DATA AFTER DELETION

*FIG. 5*

| TIME T | SENSOR A | SENSOR B | SENSOR C | SENSOR D |
|---|---|---|---|---|
| 1 | | | | |
| 2 | | | | |
| 3 | | | | |
| 4 | | | | |
| 5 | | | c5 | d5 |
| 6 | a6 | | c6 | d6 |
| 7 | a7 | | c7 | d7 |
| 8 | a8 | | c8 | d8 |
| 9 | a9 | | | |
| 10 | a10 | | | |
| 11 | a11 | | | |
| 12 | a12 | | | |
| 13 | a13 | | | |
| 14 | a14 | | | |
| 15 | a15 | | | |
| 16 | a16 | | | |
| 17 | a17 | | | |
| 18 | a18 | | | |
| 19 | a19 | | | |
| 20 | a20 | | | |
| . | . | . | . | . |

600 PERMISSION LIST

| TIME T | SENSOR A | SENSOR B | SENSOR C | SENSOR D |
|---|---|---|---|---|
| 1 | a1 | b1 | c1 | d1 |
| 2 | a2 | b2 | c2 | d2 |
| 3 | a3 | b3 | c3 | d3 |
| 4 | a4 | b4 | c4 | d4 |
| 5 | a5 | b5 | N/A | N/A |
| 6 | N/A | b6 | N/A | N/A |
| 7 | N/A | b7 | N/A | N/A |
| 8 | N/A | b8 | N/A | N/A |
| 9 | N/A | b9 | c9 | d9 |
| 10 | N/A | b10 | c10 | d10 |
| 11 | a11 | b11 | c11 | d11 |
| 12 | a12 | b12 | c12 | d12 |
| 13 | a13 | b13 | c13 | d13 |
| 14 | a14 | b14 | c14 | d14 |
| 15 | a15 | b15 | c15 | d15 |
| 16 | N/A | b16 | c16 | d16 |
| 17 | N/A | b17 | c17 | d17 |
| 18 | N/A | b18 | c18 | d18 |
| 19 | a19 | b19 | c19 | d19 |
| 20 | a20 | b20 | c20 | d20 |
| . | . | . | . | . |

MEASUREMENT DATA AFTER DELETION

DATA MANAGEMENT SYSTEM, DATA MANAGEMENT METHOD, AND RECORDING MEDIUM HAVING RECORDED THEREON A DATA MANAGEMENT PROGRAM

The contents of the following Japanese patent application(s) are incorporated herein by reference:
No. 2020-051054 filed in JP on Mar. 23, 2020

1. TECHNICAL FIELD

The present invention relates to a data management system, a data management method and a recording medium having recorded thereon a data management program.

2. RELATED ART

Patent document 1: Japanese Patent Application Publication No. 2011-175540 states that "the means for constructing a prediction/diagnostic model . . . checks whether the measurement data deviate from the upper/lower limit value for each of temperature, pressure, and gas amount, and deletes the data that deviate from the upper/lower limit value as abnormal data unsuitable for training . . . ".

DESCRIPTION OF EXEMPLARY EMBODIMENTS

Hereinafter, the present invention will be described with reference to embodiments of the invention. However, the following embodiments shall not be construed as limiting the claimed invention. Also, not all combinations of features described in the embodiments are essential for means to solve problems provided by aspects of the invention.

Figure 1:
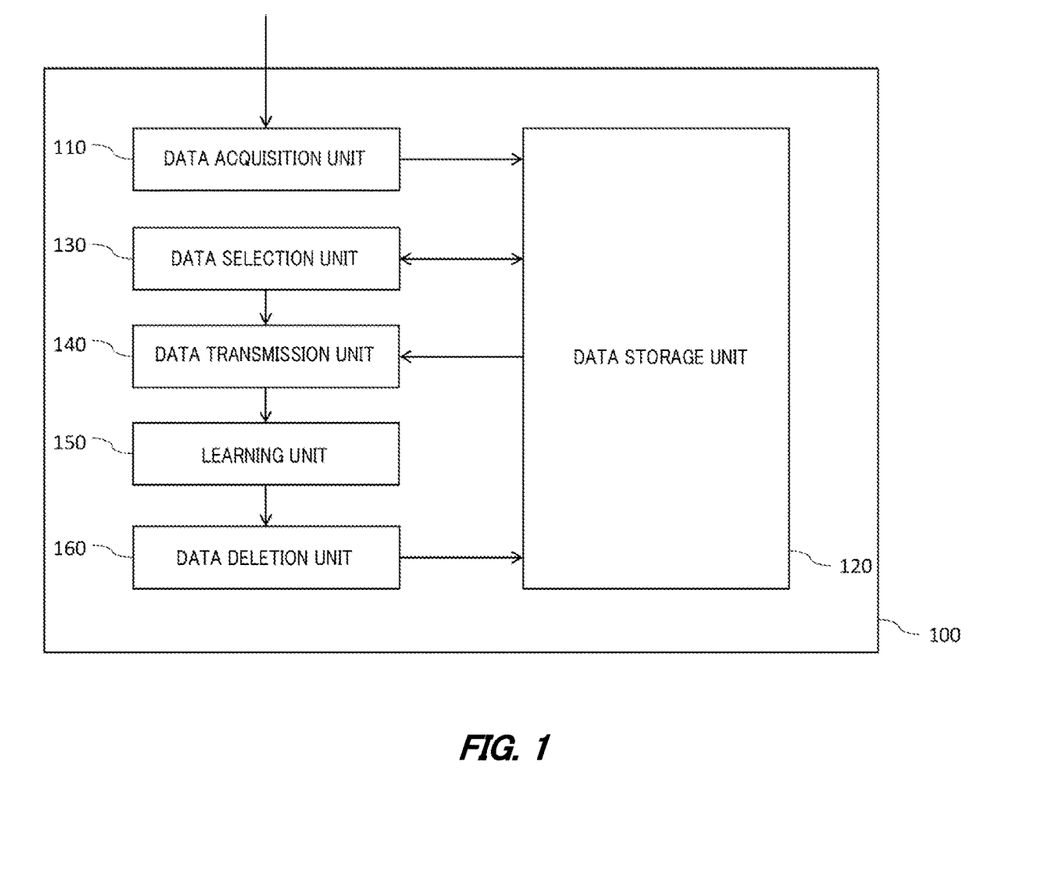
FIG. 1 illustrates one example of a block diagram of a data management system 100 according to this embodiment.

FIG. 1 illustrates one example of a block diagram of a data management system 100 according to this embodiment. The data management system 100 according to this embodiment acquires and stores measurement data. Then, the data management system 100 transmits training data to the functional unit for executing training, and deletes the training data from the stored measurement data.

In this embodiment, one example about the case where the data management system 100 treats the acquired measurement data from a plurality of sensors provided in a plant as management target is shown. However, it is not limited to this. The data management system 100 may also treat the data from one or more field devices or the like installed in any place different from a plant as management target.

The data management system 100 may be a computer, such as a PC (personal computer), a tablet computer, a smart phone, a workstation, a server computer, or a general purpose computer, and may also be a computer system with a plurality of computers connected to it. Such a computer system is also a computer in a broad sense. Also, the data management system 100 may also be implemented by one or more executable virtual computer environments in the computer. Instead of that, such a data management system 100 may be a dedicated computer designed to generate priority tables, or a dedicated hardware realized by dedicated circuits. Also, when the data management system 100 can be connected to an internet, the data management system 100 may also be realized by cloud computing.

The data management system 100 includes a data acquisition unit 110, a data storage unit 120, a data selection unit 130, a data transmission unit 110, a learning unit 150 and a data deletion unit 160. These blocks are each a functionally separated functional block, and may not necessarily correspond to the actual device configuration. That is, in this diagram, even though each block is shown as a single block, it may not necessarily configured by a single device. Also, in this diagram, even though the blocks are shown as separate blocks, they may not necessarily configured by separate devices.

The data acquisition unit 110 acquires measurement data on the measurement target. As one example, the data acquisition unit 110 may be a communication unit, and for example, acquires the measurement data from each of a plurality of sensors in a time series via the communication network.

Such a communication network may be a network connecting a plurality of computers. For example, the communication network may be a global network mutually connecting a plurality of computer networks. As one example, communication network may be an internet using internet protocol and the like. Alternatively, communication network may also be realized by dedicated line.

Additionally, in the above-mentioned description, the case where the data acquisition unit 110 acquires measurement data from each of the plurality of sensors via the communication network is shown as an example, but it is not limited to this. The data acquisition unit 110 may also acquire the measurement data from each of the plurality of sensors via other means different from the communication network, for example, user inputs and various memory devices and the like.

Herein, such a plurality of sensors can acquire the measurement data on the measurement target. The plurality of sensors, for example, may be sensors installed in OT (Operational Technology) region (for example, sensors for process control (measurement)) or IoT (Internet of Things) sensors. As one example, the sensors may be industrial sensors connected to or integrally configured with one or more field devices installed in the plant.

Herein, such plants may be, for example, besides industrial plants such as chemical plants, plants for controlling and managing wellheads and surroundings of gas or oil fields, plants for controlling and managing power generation such as hydro, thermal, nuclear power generation, plants for controlling and managing environmental power generation such as solar and wind power generation, and plants for controlling and managing water supply and sewerage or dams, and so on.

Also, the field devices installed in such plants may be, for example, sensor devices such as pressure gauges, flow meters or temperature sensors, valve devices such as flow control valves or switch valves, actuator devices such as fans or motors, imaging devices such as cameras or videocameras that capture conditions and objects in the plant, acoustic devices such as microphones or speakers that collect unusual sounds or the like in the plant or emit alarm sounds or the like, and location detector devices that output location information for each device.

Accordingly, the data acquisition unit 110 may acquire, for example, temperature, pressure, flow rate, acceleration, magnetic field, location, camera image, switch on/off data, sound and combination thereof and the like as the measurement data. Also, the data acquisition unit 110 may also acquire the value generated by equations based on these data as the measurement data. The data acquisition unit 110 supplies the acquired measurement data from each of the plurality of sensors to the data storage unit 120.

The data storage unit 120 stores the measurement data. As an example, the data storage unit 120 may store the measurement data from a plurality of field devices and the like supplied by the data acquisition unit 110 for each sensor in a time series.

The data selection unit 130 selects training data for training the model from the measurement data. As an example, the data selection unit 130 may be accessible to the data storage unit 120, and view the measurement data from a plurality of field devices and the like, stored by the data storage unit 120. Then, the data selection unit 130 selects the data sets suitable for training the model configured to judge the state of measurement target from the measurement data from a plurality of field devices and the like as the training data. The data selection unit 130 supplies information about the selected training data to the data transmission unit 140.

The data transmission unit 140 transmits the training data for training the model in the measurement data, to the learning unit 150 for training the model. As an example, the data transmission unit 140 may have access to the data storage unit 120, and read the data sets selected as training data by the data selection unit 130, from the measurement data from a plurality of field devices and the like stored by the data storage unit 120. Then, the data transmission unit 140 transmits the read data sets as training data, to the learning unit 150 for training the model.

The learning unit 150 is a functional unit for executing the training of the model configured to judge the state of the measurement target. The learning unit 150 transmits an acknowledgement (ACK) of the training data according to the receipt of the training data, to the data deletion unit 160 in addition to the data transmission unit 140. Then, the learning unit 150 trains the model for judging the state of the measurement target by using the training data. Here, the learning unit 150 may use various algorithms in training the model. The learning unit 150 may use, for example, regression analysis, cluster analysis, principal component analysis, vector quantization, self-organization map, neural network, support vector machine, ID3, and simple Bayesian classifier and so on as the training algorithm. The learning unit 150 transmits a response to the data deletion unit 160 indicating that the training data have been trained, when the model training using the training data has ended. Additionally, such a response indicating that the training has ended may also include the indication that the training data do not need to be re-trained, and the deletion of the training data is permitted.

The data deletion unit 160 deletes training data from the stored measurement data. As an example, the data deletion unit 160 may access to the data storage unit 120, and delete the data sets transmitted as training data to the learning unit 150, from the measurement data from a plurality of field devices and the like stored by the data storage unit 120.

Additionally, in this diagram, one example for the case where the learning unit 150 is installed in the data management system 100 is shown. Accordingly, the data management system 100 can realize the processing from the data management to the model training by one system. Thereby, with the data management system 100, reducing the risk of leaking training data to the outside and simplifying the system management and the maintenance can be achieved together. However, generally, there is a huge burden for the model training. Accordingly, the function of learning unit 150 may also be installed in other systems different from the data management system 100. Thereby, the data management system 100 can be made smaller and lower in capacity.

Figure 2:
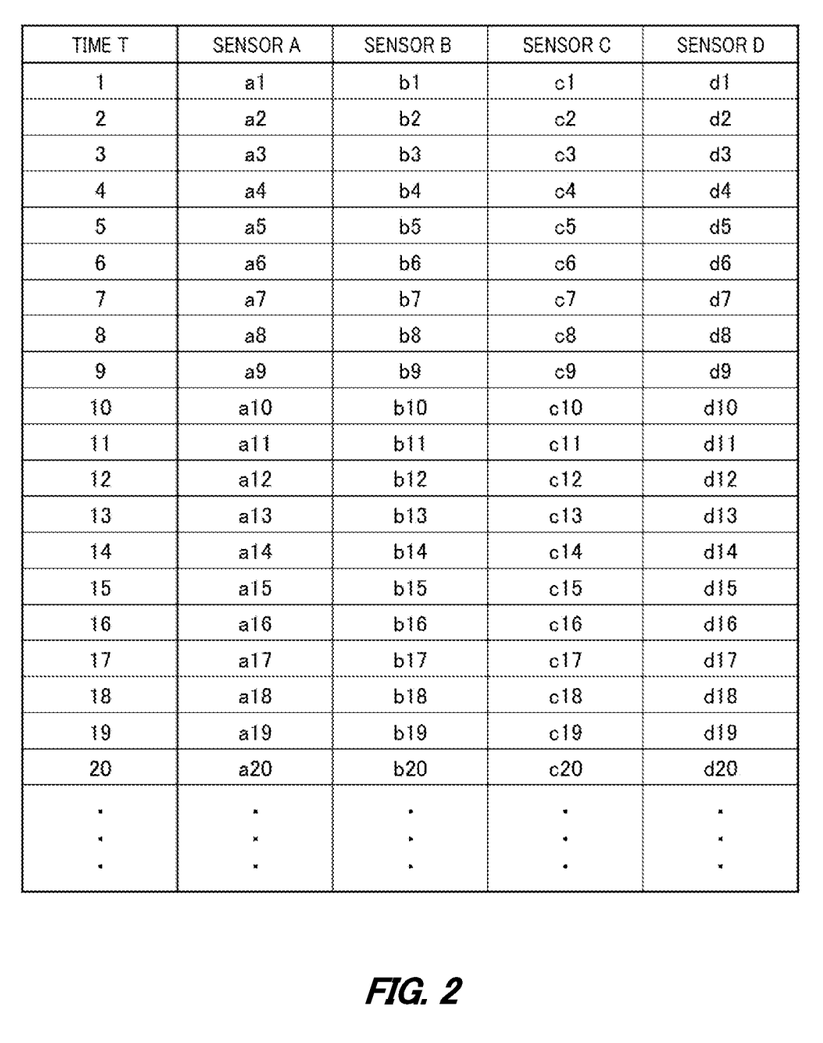
FIG. 2 illustrates one example of measurement data managed by the data management system 100 according to this embodiment.

FIG. 2 illustrates one example of the measurement data managed by the data management system 100 according to this embodiment. In this diagram, one example for the case where the data management system 100 manages the measurement data from four sensors of sensor A, sensor B, sensor C and sensor D will be explained. However, it is not limited to this. The data management system 100 may also manage the measurement data from a plurality of sensors more than four, or may manage the measurement data from one or more sensors less than four.

Herein, each type of the plurality of sensors may also be the same. That is, all the sensors from sensor A to D may also be able to acquire the measurement data of the same type (for example, temperature and the like). Alternatively, the types of the plurality of sensors may also be different partially or entirely. That is, some of the sensors from sensor A to D may also be able to acquire different types of measurement data (for example, temperature or pressure and so on); all of the sensors from sensor A to sensor D may also be able to acquire different types of measurement data (such as temperature, pressure, flow rate and acceleration).

In this diagram, the measurement data from sensor A, sensor B, sensor C and sensor D is shown in a time series from Time T=1 to Time T=20. Additionally, in this diagram, the case where the data management system 100 has acquired the measurement data from all sensors in a time-synchronized manner is shown as one example. However, it is not limited to this. The data management system 100 may also acquire the measurement data asynchronously from at least some of the plurality of sensors. As an example, the measurement data from sensor A at Time T=1 is shown as data a1. Similarly, the measurement data from sensor B at Time T=2 is shown as data b2. Similarly, the measurement data from sensor C at Time T=19 is shown as data c19. Similarly, the measurement data from sensor D at Time T=20 is shown as data d20.

Data management system 100 according to this embodiment, for example, acquires and stores the measurement data illustrated in this diagram. Then, data management system 100 transmits the training data to functional unit for executing training, and deletes the training data from stored measurement data. This will be explained in detail using the flow.

Figure 3:
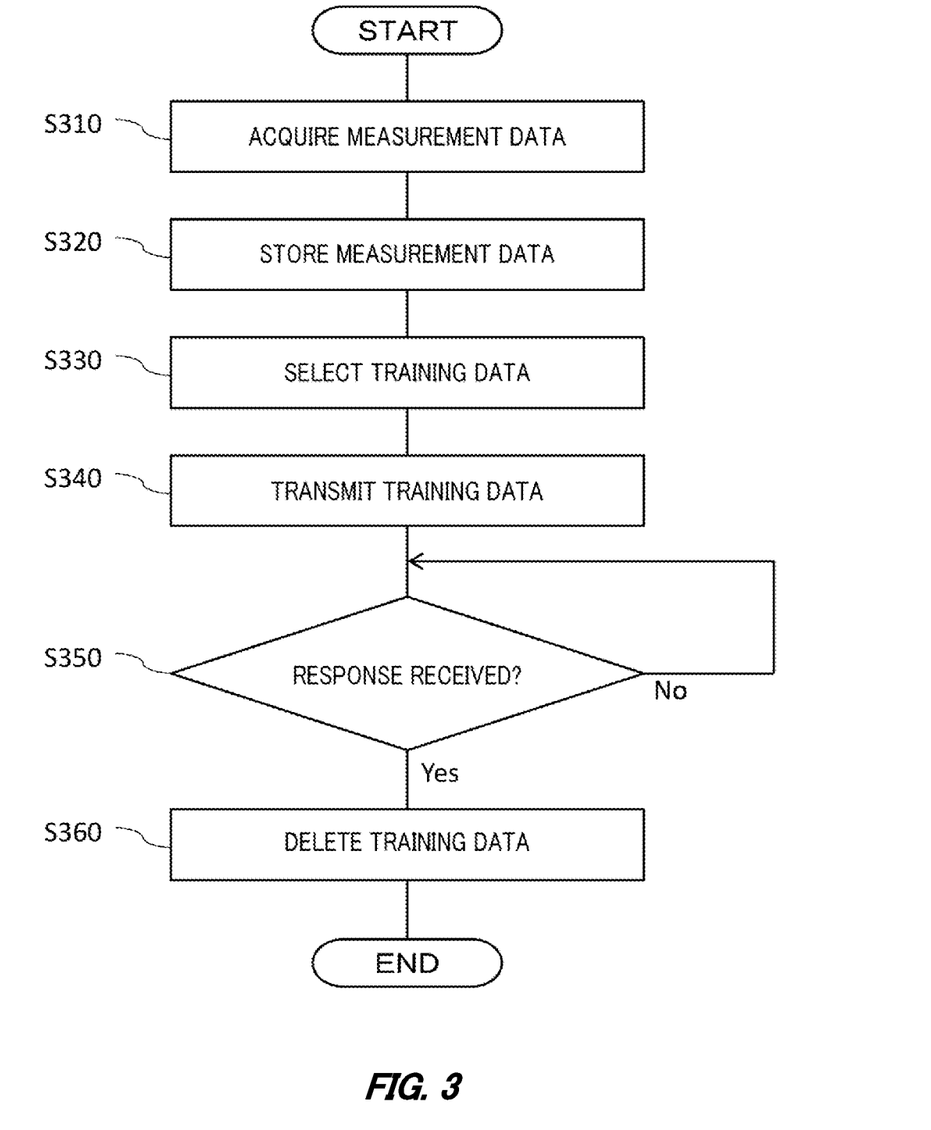
FIG. 3 illustrates one example of a flow in which the data management system 100 deletes training data according to this embodiment.

FIG. 3 illustrates one example of a flow in which the data management system 100 deletes the training data according to this embodiment.

In step 310, the data management system 100 acquires the measurement data. As an example, the data acquisition unit 110 acquires the measurement data from each of the plurality of sensors (for example, sensor A, sensor B, sensor C and sensor D) in a time series via the communication network. The data acquisition unit 110 supplies the acquired measurement data from each of the plurality of sensors to the data storage unit 120.

In step 320, the data management system 100 stores measurement data. As an example, the data storage unit 120 stores the measurement data from a plurality of sensors acquired in step 310 in a time series for each sensor.

In step 330, the data management system 100 selects training data used for training the model, from measurement data. As an example, the data selection unit 130 accesses the data storage unit 120, and views the measurement data from the plurality of sensors stored in step 320. Then, the data selection unit 130 automatically selects data sets suitable for training the model configured to judge the state of the measurement target as the training data for the model training, from the measurement data from the plurality of sensors based on the predetermined criteria. Herein, the method itself for selecting the training data may also use any method. Accordingly, detailed explanations will be omitted here. Additionally, in the above-mentioned description, the case where the data selection unit 130 automatically selects the training data is shown as one example. However, it is not limited to this. The data management system 100 receives user inputs, and the data selection unit 130 may also select the training data according to the user inputs.

As an example, the data selection unit 130 may select the sets of measurement data (for example, data a4~data d10) from all the sensors in a particular period (for example, time T=4~time T=10) as the training data. Also, the data selection unit 130 may select the sets of measurement data (for example, data d1~data d20) from a particular sensor (for example, sensor D) in all periods as the training data. Also, the data selection unit 130 may select the sets of measurement data (for example, data c13~data c15) from a particular sensor (for example, sensor C) in a particular period (for example, time T=13~time T=15) as the training data. Also, the data selection unit 130 may select the sets of the measurement data (for example, data a16~data b18) from a plurality of sensors (for example, sensor A and sensor B) in a particular period (for example, time T=16~time T=18) as the training data. The data selection unit 130 supplies information about the selected training data to the data transmission unit 140.

In step 340, the data management system 100 transmits training data in the measurement training data the model to the learning unit 150 for training the model. As an example, the data transmission unit 140 accesses the data storage unit 120, reads the data sets (for example, data a4~data d10, data d1~data d20, data c13~data c15, and data a16~data b18) selected as training data in step 330 from the measurement data from the plurality of sensors stored in step 320. Then, the data transmission unit 140 transmits the read data sets as training data to the learning unit 150 for training the model.

In step 350, the data management system 100 judges whether the response is received. As an example, the data deletion unit 160 judges whether an acknowledgement of the training data is received, which is transmitted by the learning unit 150 in response to the receipt of the training data. Alternatively, the data deletion unit 160 may also judge whether a response indicating that the training data have been trained is received, which is transmitted by the learning unit 150 in response to the end of the model training using the training data. Additionally, such a response indicating that the training has ended, as mentioned above, may also include the indication that the training data does not need to be re-trained, and the deletion of the training data is permitted.

When the response is judged not to be received in step 350, the data management system 100 returns the process to step 350 and continues the flow. On the other hand, when the response is judged to be received in step 350, the data management system 100 advances the process to step 360.

In step 360, the data management system 100 deletes the training data from the stored measurement data. As an example, the data deletion unit 160 accesses to the data storage unit 120, deletes the data sets (for example, data a4~data d10, data d1~data d20, data c13~data c15, and data a16~data b18) selected as training data in step 330 from the measurement data from the plurality of sensors stored in step 320. For example, the data deletion unit 160 deletes the training data, in response to the received acknowledgement of the training data from the learning unit 150. Alternatively, the data deletion unit 160 may delete the training data according to the received response from the learning unit 150 indicating that the training data has been trained.

Additionally, in above-mentioned description, the case where the data deletion unit 160 deletes the training data according to the response from the learning unit 150 is shown as one example. However, it is not limited to this. The data deletion unit 160 may also delete training data by moving the training data to the learning unit 150. In this case, the data deletion unit 160 may also be integrally configured with the data transmission unit 140. That is, the data transmission unit 140 and the data deletion unit 160 may also move the stored data themselves from the data storage unit 120 to the learning unit 150, rather than copying and transmitting the data sets (for example, data a4~data d10, data d1~data d20, data c13~data c15, and data a16~data b18) selected as the training data in step 340, from the data storage unit 120 to the learning unit 150. In this manner, the data deletion unit 160 may delete the training data from stored measurement data, in response to the transmitting to the learning unit 150.

Figure 4:
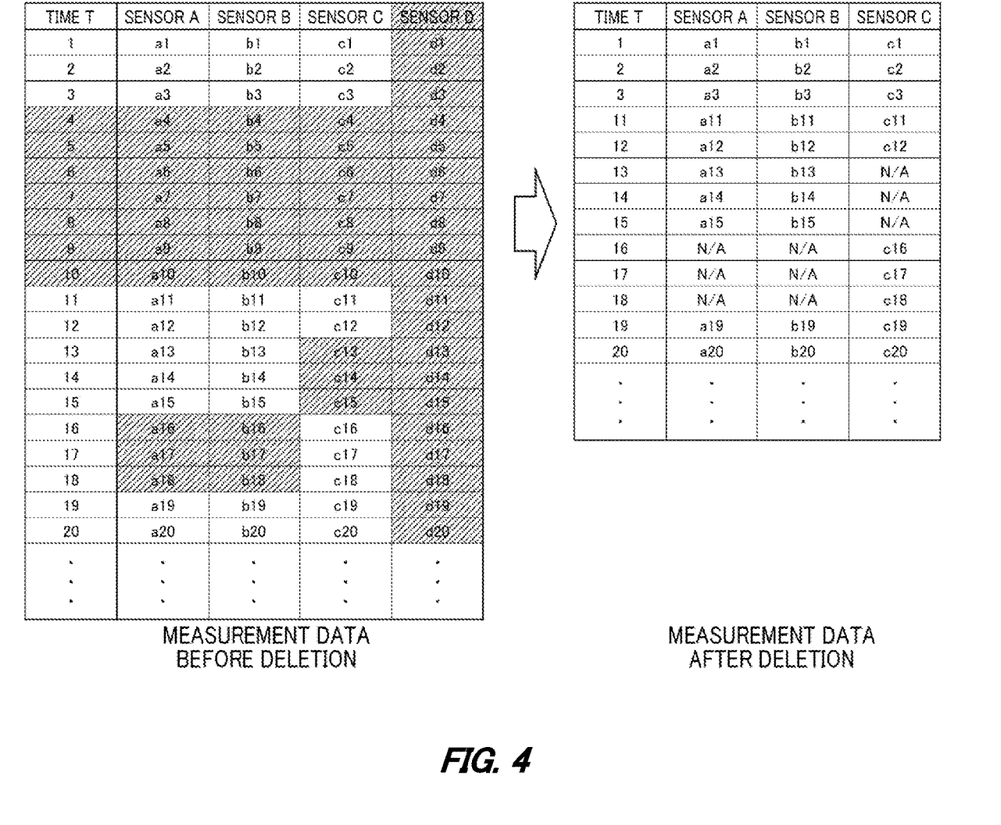
FIG. 4 illustrates one example of measurement data before and after the data management system 100 deletes training data according to this embodiment.

FIG. 4 illustrates one example of the measurement data before and after the data management system 100 according to this embodiment deletes the training data. In the left of this diagram, one example of the measurement data before the deletion of the training data is shown. In the left of this diagram, oblique line portion is the data sets selected as training data, that is, data a4~data d10, data d1~data d20, data c13~data c15 and data a16~data b18. The data management system 100 according to this embodiment deletes the training data, that is, the data sets of the oblique line portion in the left of this diagram, through the flow in FIG. 3.

In the right of this diagram, one example of the measurement data after the deletion of the training data is shown. As shown in the right of this diagram, the measurement data during time T=4~time T=10 are deleted for all the sensors (in the diagram, the data are deleted including the lines). Also, the measurement data from sensor D are deleted in all periods (in the diagram, the data are deleted including the columns). Also, the measurement data from sensor C during time T=13~time T=15 are deleted (in the diagram, they are denoted by "N/A"). Similarly, the measurement data from sensor A and sensor B during time T=16~time T=18 are deleted (in the diagram, they are denoted by "N/A"). In this manner, the data management system 100 according to this embodiment transmits the training data to the learning unit 150, and deletes the training data from the measurement data stored by the data storage unit 120.

For example, like the combination of process control system in OT (Operational Technology) region and system in IT (Information Technology) region, the volume of data is expected to explosively increase. In such a situation, it is not realistic to store all the data, but necessary to reduce or select the volume of the data. Conventionally, the model construction device for deleting abnormal data unsuitable for training and creating training data is well known. In the model construction device, the selection is executed for excluding the abnormal data in creating the training data using the new data sets from the measurement data accumulated in database. Accordingly, the model construction device does not delete measurement data themselves accumulated in the database, and the volume of measurement data accumulated in the database cannot be reduced. Also, in the model construction device, the criteria for deleting data is whether the data are suitable for training, and is not based on whether the data have been transmitted to the functional unit for executing training.

In contrast, the data management system 100 according to this embodiment transmits the training data to the functional unit for training the model, that is, the learning unit 150, and deletes the training data from measurement data stored by the data storage unit 120. Thereby, with the data management system 100 according to this embodiment, it is possible to selectively delete the data that are going to be trained in model training or have been trained from the data storage unit 120, and to reduce the volume of the measurement data stored by the data storage unit 120.

Also, the data management system 100 of an aspect according to this embodiment does not delete the training data unilaterally, but deletes the training data according to the response from the learning unit 150. Thereby, with the data management system 100 according to this embodiment, for example, when error happens during the transmitting to the learning unit 150, the inadvertent deletion of the training data can be prevented.

Also, the data management system 100 of an aspect according to this embodiment deletes the training data, according to a response indicating that the training of the training data has ended, from the learning unit 150. Thereby, with the data management system 100 according to this embodiment, it is possible to only delete the trained data that have actually been confirmed to be trained.

Also, the data management system 100 of an aspect according to this embodiment moves the training data from the data storage unit 120 to the learning unit 150. Thereby, with the data management system 100 according to this embodiment, it is possible to simplify the process by eliminating the need for a response from the learning unit 150.

Figure 5:
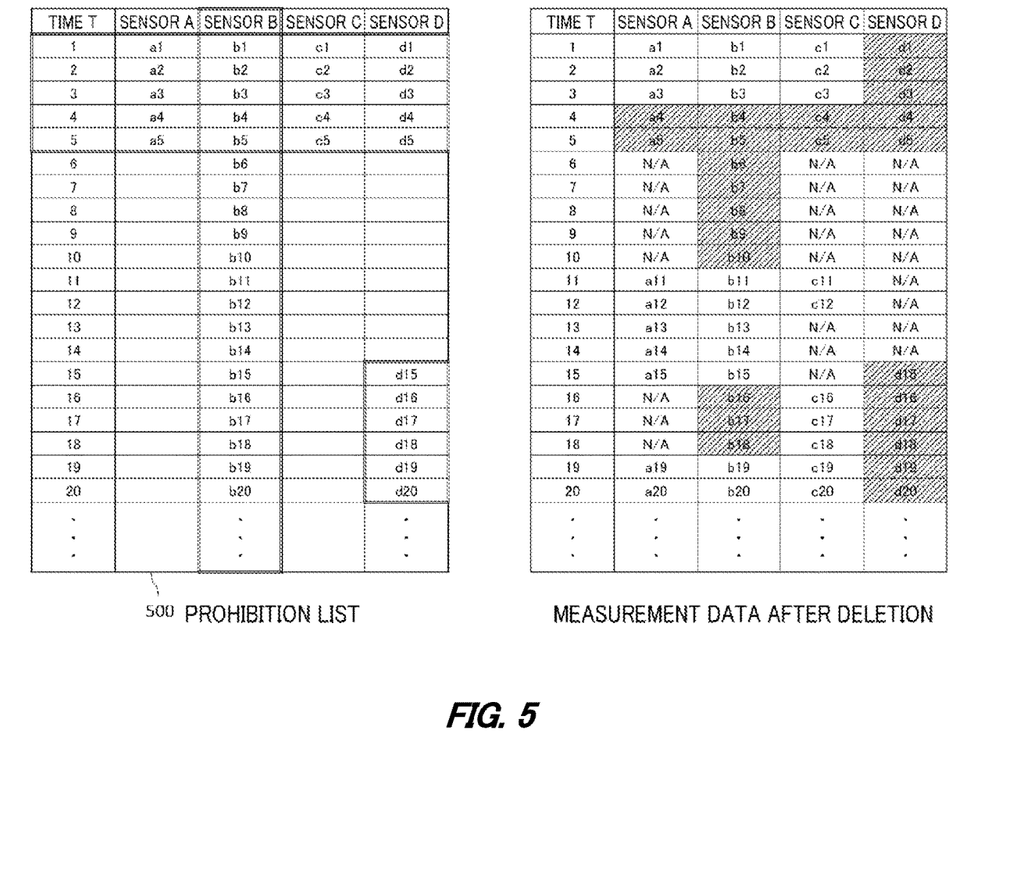
FIG. 5 illustrates one example of a prohibition list 500 and measurement data after deletion according to this embodiment, when the data management system 100 has deleted the training data using the prohibition list 500.

In above-mentioned description, the case where the data management system 100 uniformly deletes the data that are going to be trained in model training or have been trained is shown as one example. However, it is not limited to this. The data management system 100 may also be able to specify the data sets prohibited to be deleted from the measurement data stored by the data storage unit 120. That is, the data deletion unit 160 has a prohibition list 500 that specifies the measurement data prohibited to be deleted, and when the training data to be deleted are specified by the prohibition list 500, may also prohibit the deletion of the training data.

FIG. 5 illustrates one example of the measurement data in the prohibition list 500 after deletion, when the data management system 100 according to this embodiment deleted training data using the prohibition list 300. The left of this diagram illustrates the prohibition list 500. In the left of this diagram, for example, the region surrounded by doublet lines has been specified as the measurement data prohibited to be deleted. As an example, in a particular period (for example, time T=1~time T=5), the data sets (for example, data a1~d5) of the measurement data from all the sensors may be specified as the measurement data prohibited to be deleted. Also, in all periods, the data sets (for example, data b1~b20) of the measurement data from a particular sensor (for example, sensor B) may be specified as the measurement data prohibited to be deleted. Also, in a particular period (for example, time T=15~time T=20), the sets of the measurement data from a particular sensor (for example, sensor D) may be specified as measurement data prohibited to be deleted. In this manner, the prohibition list 500 may have at least any of the item that specifies the period in which deletion is prohibited, the item that specifics the sensors for which deletion is prohibited, and, the item that specifics the period and sensors for which deletion is prohibited.

In such cases, the data management system 100 prohibits the deletion of the measurement data specified by the prohibition list 500 among the training data. For example, the data management system 100 prohibits the deletion of the measurement data from sensor A during time T=1~time T=5 among the training data. Similarly, the data management system 100 prohibits the deletion of the measurement data from sensor B during time T=4~time T=10, and time T=16~time T=18 among the training data. Similarly, the data management system 100 prohibits the deletion of the measurement data from sensor C during time T=4~time T=5 among the training data. Similarly, the data management system 100 prohibits the deletion of the measurement data from sensor D during time T=1~time T=5 and time T=15~time T=20 among the training data.

Additionally, such a prohibition list 500 may be set based on user inputs. Alternatively, the data management system 100 may also set the prohibition list 500. In this case, the data management system 100, for example, may also collect the statistics of measurement data stored by the data storage unit 120 in a predetermined period, and automatically specify the data sets prohibited to be deleted based on the statistics (for example, by automatically extracting specific data).

The right of this diagram illustrates one example of the measurement data after deletion when using the prohibition list 500. In this diagram the region denoted by "N/A" indicates a region where the measurement data were deleted, that is, a region of the training data that are not specified by the prohibition list 500. On the other hand, in this diagram the region indicated by oblique line indicates a region where deletion of measurement data is prohibited, that is, a region of the training data that have been specified by the prohibition list 500 among the training data.

In this manner, the data management system 100 according to this embodiment prohibits the deletion of some data sets using the prohibition list 500. Thereby, with the data management system 100 according to this embodiment, the inadvertent deletion of the measurement data that may be referenced later or that may be referenced by other users can be prevented.

Figure 6:
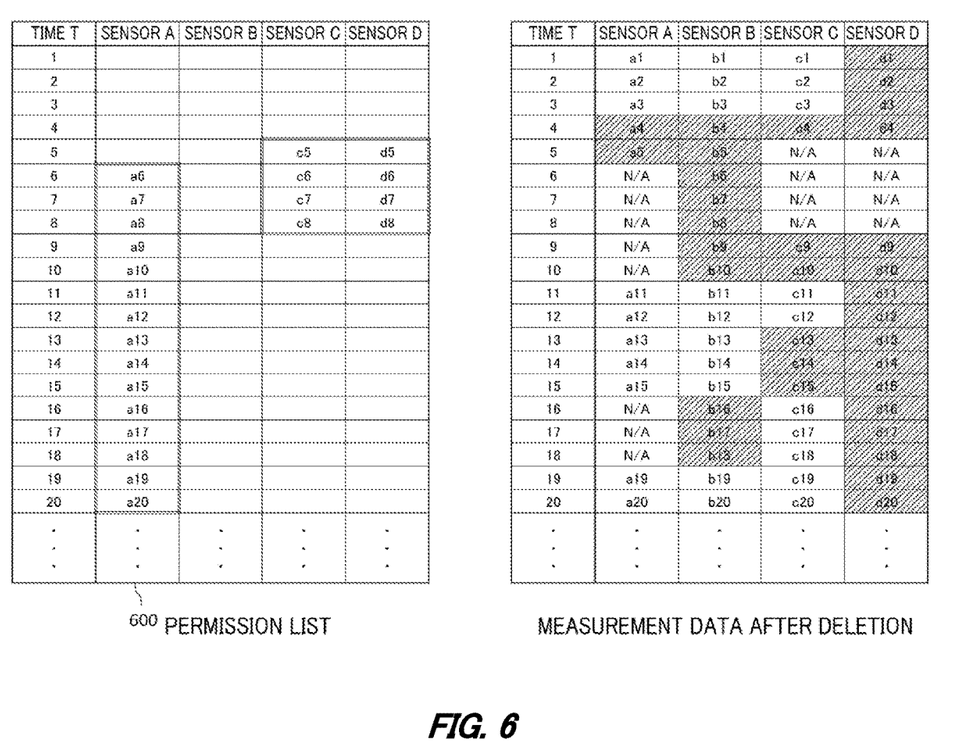
FIG. 6 illustrates one example of a permission list 600 and the measurement data after deletion according to this embodiment, when the data management system 100 has deleted the training data using the permission list 600.

Additionally, in above-mentioned description, the case where the data management system 100 uses the prohibition list 500, that is, the block list, which prohibits the deletion, is shown as one example. However, alternatively, the data management system 100 may also be able to use the permission list 600, that is, the white list, which permits the deletion, to specify the data sets that permit the deletion. That is, the data deletion unit 160 has a permission list 600 for specifying the measurement data permitted to be deleted, and when the training data to be deleted are specified by the permission list 600, may also permit the deletion of the training data.

FIG. 6 illustrates one example of the measurement data in the permission list 600 after deletion, when the data management system 100 according to this embodiment deleted training data using the permission list 600. The left of this diagram illustrates the permission list 600. In the left of this diagram, for example, the region surrounded by doublet lines has been specified as the measurement data permitted to be deleted. As an example, in a particular period (for example, time T=6~time T=20), the data sets (for example, data a6~a20) of the measurement data from a particular sensor (for example, sensor A) may be specified as the measurement data permitted to be deleted. Also, in a particular period (for example, time T=5~time T=8), the data sets (for example, data c5~d8) of the measurement data from a plurality of sensors (for example, sensor C and sensor D) may be specified as the measurement data permitted to be deleted. In this manner, the permission list 600 may have at least any of the items that specify the period in which deletion is permitted, the items that specify the sensors for which deletion is permitted, and, the items that specify the period and sensors for which deletion is permitted.

In such cases, the data management system 100 permits the deletion of the measurement data specified by the permission list 600 among the training data. For example, the data management system 100 deletes the measurement data from sensor A during time T=6~time T=10, and time T=16~time T=18. Also, the data management system 100 deletes the measurement data from sensor C and sensor D during time T=5~time T=8.

Additionally, such a permission list 600, the same as the prohibition list 500, may also be set up based on user inputs. Alternatively, the data management system 100 may also set up the permission list 600. In this case, the data management system 100, for example, may also collect the statistics of the measurement data stored by the data storage unit 120 in a predetermined period, and automatically specify the data sets permitted to be deleted based on the statistics (for example, by automatically extracting data with relatively small differences from the mean value and median value).

The right of this diagram illustrates one example of the measurement data after deletion when using the permission list 600. In this diagram the region denoted by "N/A" indicates a region where the measurement data were deleted, that is, a region of the training data that are specified by the permission list 600 among the training data. On the other hand, in this diagram the region indicated by oblique line indicates a region where deletion of the measurement data is permitted, that is, a region of the training data that are not specified by the permission list 600 among the training data.

In this manner, the data management system 100 according to this embodiment permits the deletion of some data sets using the permission list 600. Thereby, with the data management system 100 according to this embodiment, only the measurement data that are unlikely to be referenced later or to be referenced by other users can be specified as the data permitted to be deleted.

Additionally, in above-mentioned description, the case where any one of the prohibition list 500 and the permission list 600 is used is shown as one example. However, it is not limited to this. The data management system 100 may also control the deletion of measurement data using both of the prohibition list 500 and the permission list 600.

In this case, the data deletion unit 160 has the prohibition list 500 that specifies the measurement data prohibited to be deleted, and the permission list 600 that specifics the measurement data permitted to be deleted, and when the training data to be deleted are specified by both of the prohibition list 500 and the permission list 600, may also prohibit the deletion of the training data.

For example, in above-mentioned description, the measurement data from sensor C and sensor D at Time T=5 are permitted to be deleted by the permission list 600, and therefore, the case of deletion is shown as an example. That is, in FIG. 6, the case where data c5 and data do are "N/A" is shown as an example. However, these data c5 and data d5 are prohibited to be deleted by the prohibition list 500. In such a case where duplicate data sets are specified between the prohibition list 500 and the permission list 600, the data management system 100 may prioritize the prohibition list 500. That is, the data management system 100 may prohibit the deletion, because that even if data c5 and data d3 are permitted to be deleted by the permission list 600, they are still prohibited to be deleted by prohibition list 500.

In this manner, the data management system 100 according to this embodiment prioritizes the prohibition list 500 when using both of the prohibition list 500 and the permission list 600. Thereby, with the data management system 100 according to this embodiment, for example, the data sets prohibited to be deleted using the prohibition list 500 by one user, can be prevented from being inadvertently deleted by the permission list set up by another user, when the prohibition list 500 and the permission list 600 are set up separately by different users.

Various embodiments of the present invention may be described with reference to flowcharts and block diagrams, wherein the blocks may represent (1) the stages of the process by which the operations are performed or (2) sections of the apparatus having the role of performing the operations. Specific stages and sections may be implemented by dedicated circuits, programmable circuits supplied together with computer readable instructions stored on a computer readable medium, and/or a processor supplied together with computer readable instructions stored on a computer readable medium. Dedicated circuit may include digital and/or analog hardware circuit, and may include integrated circuits (IC) and/or discrete circuit. Programmable circuit may include reconfigurable hardware circuit, including logical AND, logical OR, logical XOR, logical NAND, logical NOR, and other logical operations, memory elements such as flip-flop, register, field programmable gate array (FPGA), programmable logic array (PLA) and so on.

The computer-readable medium may include any tangible device capable of storing instructions to be executed by the appropriate device, and as a result, the computer-readable medium with instructions stored therein will have a product, including instructions that can be executed to create the means to execute the operations specified in the flowchart or block diagram. As an example of computer-readable medium, electronic storage medium, magnetic storage medium, optical storage medium, electromagnetic storage medium, semiconductor storage medium, and the like may be included. As a more specific example of computer readable medium, floppy (registered trademark) disk, diskette, hard disk, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), digital versatile disk (DVD), Blue-ray® disk, memory stick, integrated circuit card and the like may be included.

Computer readable instructions may include assembler instructions, instruction set architecture (ISA) instructions, machine instructions, machine-dependent instructions, microcodes, firmware instructions, state-setting data, or object-oriented programming languages such as Smalltalk (registered trademark), Java (registered trademark), C++ and so on, and traditional procedural programming languages such as the "C" programming language or similar programming language, may also include either source code or object code written in any combination of one or more programming languages.

Computer readable instructions may be provided to a processor or programmable circuit of a general purpose computer, a special purpose computer, or other programmable data processing device locally or via a local area network (LAN), a wide area network (WAN) such as the Internet, and the computer readable instructions may be executed to create the means for performing operations specified in the flow chart or block diagram. Examples of processors include computer processors, processing units, microprocessors, digital signal processors, controllers, microcontrollers, and so on.

Figure 7:
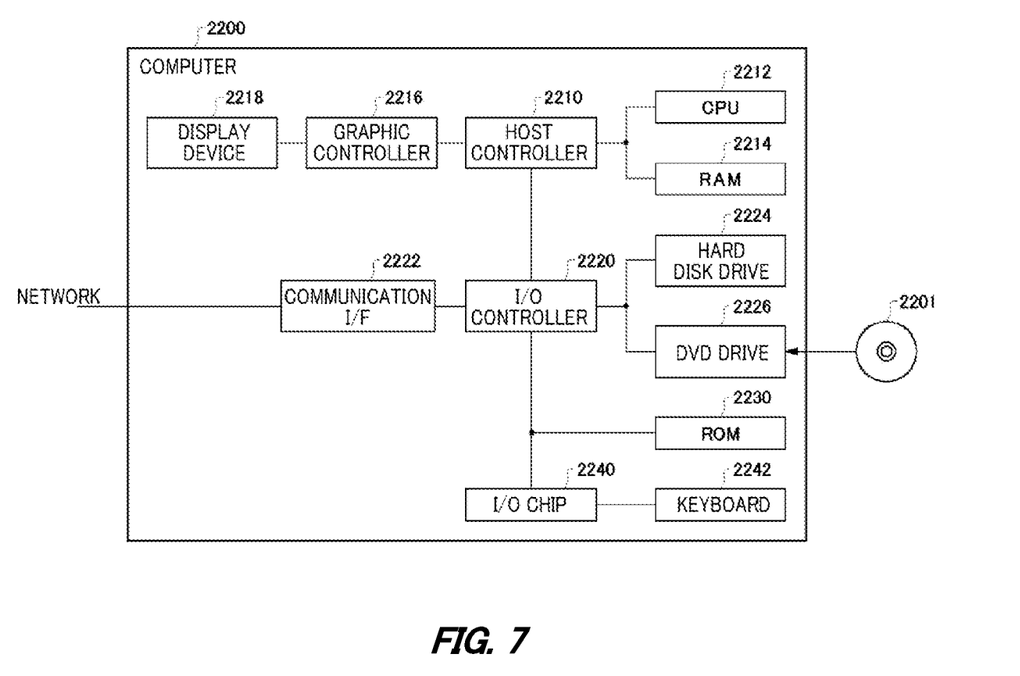
FIG. 7 illustrates one example of a computer 2200 in which a plurality of aspects of the present invention may be embodied entirely or partially.

FIG. 7 illustrates one example of computer 2200 in which a plurality of aspects of the present invention may be embodied entirely or partially. A program installed in the computer 2200 can cause the computer 2200 to function as operations associated with apparatuses according to embodiments of the present invention or one or more sections of the apparatuses, and/or cause the computer 2200 to perform processes or stages of said processes associated with embodiments of the present invention. Such a program may be executed by a CPU 2212 to cause the computer 2200 to perform specific operations associated with some or all of the blocks of the flowcharts and block diagrams described in this specification.

The computer 2200 according to this embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units, such as a ROM 2230 and a keyboard 2242, which are connected to the input/output controller 2220 via an input/output chip 2240.

The CPU 2212 operates in accordance with the program stored in the ROM 2230 and the RAM 2214, thereby controlling each unit. The graphics controller 2216 acquires image data generated by the CPU 2212 in a frame buffer or the like provided in the RAM 2214 or in itself, so that the image data is displayed on the display device 2218.

The communication interface 2222 communicates with other electronic devices via a network. The hard disk drive 2224 stores programs and data used by the CPU 2212 in the computer 2200. The DVD-ROM drive 2226 reads the programs or data from the DVD-ROM 2201, and provides the programs or data to the hard disk drive 2224 via the RAM 2214. The IC card drive reads the programs and data from an IC card, and/or writes the programs and data into the IC card.

The ROM 2230 stores therein a boot program and the like that are executed by the computer 2200 at the time of activation and/or programs dependent on the hardware of the computer 2200. The input/output chip 2240 may also connect various input/output units to the input/output controller 2220 via a parallel port, a serial port, a keyboard port, a mouse port and so on.

Programs are provided by a computer readable medium such as the DVD-ROM 2201 or the IC card. The programs are read from the computer readable medium, installed in the hard disk drive 2224, the RAM 2214 or the ROM 2230 which is also an example of the computer readable medium, and then executed by the CPU 2212. Information processing described in these programs is read into the computer 2200, which results in a linkage between the programs and the various types of hardware resources described above. An apparatus or a method may be configured by accomplishing the operations or processing of information in accordance with the use of the computer 2200.

For example, when communications are performed between the computer 2200 and an external device, the CPU 2212 may execute a communication program loaded in the RAM 2214, and instruct the communication interface 2222 to perform communication processing based on the processing described in the communication program. The communication interface 2222 reads transmission data stored in a transmission buffer processing area provided in a recording medium such as the RAM 2214, the hard disk drive 2224, the DVD-ROM 2201 or the IC card, under the control of the CPU 2212, and transmits the read transmission data to a network, or writes the reception data received from the network into a reception buffer processing area or the like provided on the recording medium.

Also, the CPU 2212 may allow all or a necessary portion of the file or database stored on an external storage medium such as the hard disk drive 2224, the DVD-ROM drive 2226 (DVD-ROM 2201), the IC card to be read into the RAM 2214, and execute various types of processing on the data on the RAM 2214. The CPU 2212 then writes back the processed data to the external recording medium.

Various types of information such as various types of programs, data, tables and databases may be stored on the recording medium to undergo information processing. The CPU 2212 may perform various types of processing on the data read from the RAM 2214, including various types of operations, information processing, condition determination, condition branching, unconditional branching, information retrieval/replacement and so on, as described throughout the present disclosure and specified by the sequence of instructions of the program, and write the results back to the RAM 2214. Also, the CPU 2212 may search for information in a file, a database, etc. in the recording medium. For example, when a plurality of entries, each having the attribute value of a first attribute associated with the attribute value of a second attribute, are stored in the recording medium, the CPU 2212 may search among the plurality of entries for an entry matching a condition where the attribute value of the first attribute is specified, and read the attribute value of the second attribute stored within said entry, thereby acquiring the attribute value of the second attribute associated with the first attribute that satisfies the predetermined conditions.

The program or software module described above may be stored in a computer readable medium on the computer 2200 or in the vicinity of the computer 2200. Also, a recording medium such as a hard disk or a RAM provided within a server system connected to a dedicated communication network or the Internet can be used as a computer readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: data management system; 110: data acquisition unit; 120: data storage unit; 130: data selection unit; 140: data transmission unit; 150: learning unit; 160: data deletion unit; 500: prohibition list; 600: permission list; 2200: computer; 2201: DVD-ROM; 2210: host controller; 2212: CPU; 2214: RAM; 2216 graphic controller; 2218: display device; 2220: input/output controller: 2222: communication interface; 2224: hard disk drive: 2228: DVD-ROM drive: 2280: ROM; 2240: input/output chip; 2242: keyboard

What is claimed is:

1. A data management method, comprising:
    acquiring measurement data from a plurality of sensors over a plurality of sampling times on a measurement target;
    storing the measurement data;
    selecting a plurality of training data sets from the stored measurement data, each of the plurality of training data sets including a range of the plurality of sampling times of at least one or more of the plurality of sensors;
    transmitting the plurality of training data sets in the measurement data, used for training a model;
    indicating that the plurality of training data sets do not need to be re-trained, and that deletion of the training data sets is permitted; and
    deleting the plurality of the training data sets from the stored measurement data.

2. The data management method according to claim 1, wherein the training data is deleted according to a response from the transmitting.

3. The data management method according to claim 2, wherein the training data is further deleted in response to receipt of an acknowledgement that the transmitted training data was received.

4. The data management method according to claim 2, wherein the training data is further deleted in response to receipt of a response indicating that training of the training model has ended.

5. The data management method according to claim 2, wherein the training data is deleted by moving a storage location of the training data.

6. The data management method according to claim 2, wherein the deletion is prohibited when training data to be deleted is specified by a prohibition list for specifying measurement data prohibited from being deleted.

7. The data management method according to claim 2, wherein the deletion is prohibited when training data to be deleted is specified by a permission list for specifying measurement data permitted to be deleted.

8. The data management method according to claim 2, wherein the deletion is prohibited when the training data is specified by both a prohibition list for specifying measurement data prohibited from being deleted and a permission list for specifying measurement data permitted to be deleted.

* * * * *